(No Model.)
C. PHILLIS.
PIPE COUPLING.
No. 320,683. Patented June 23, 1885.
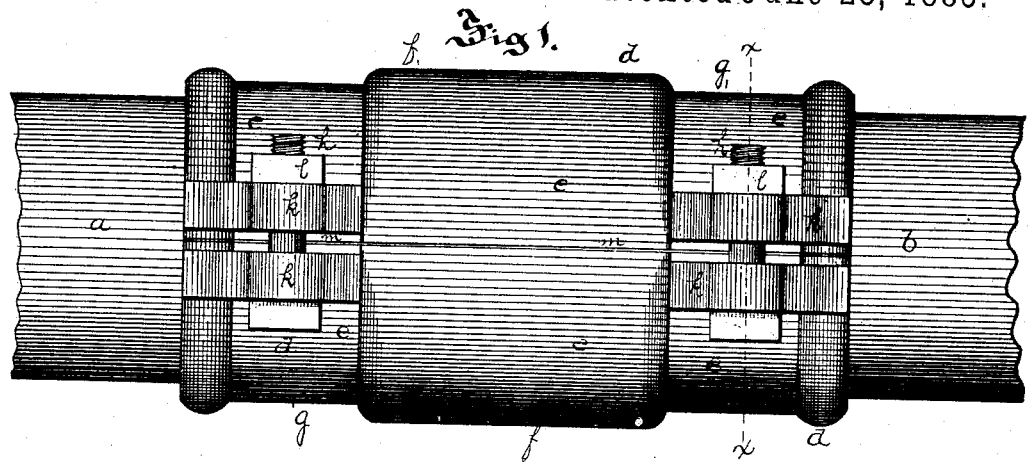
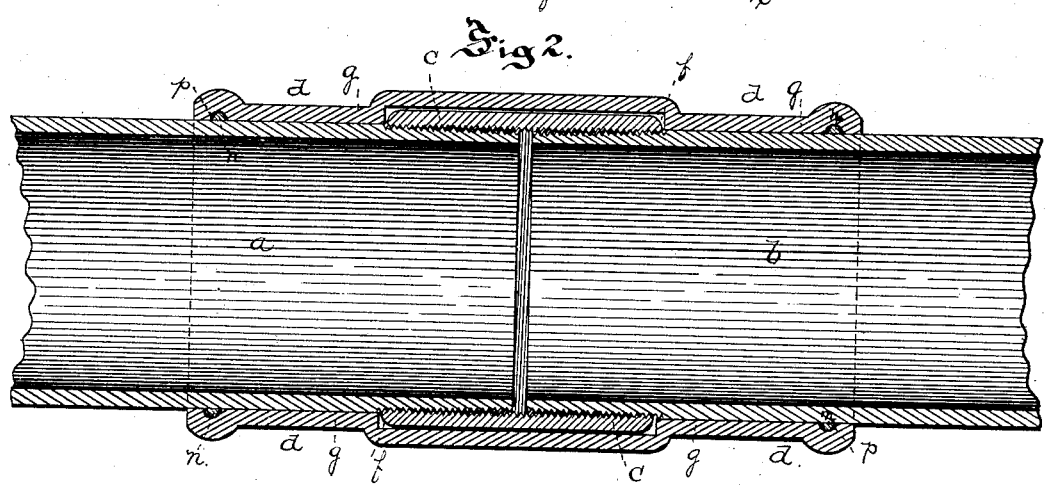
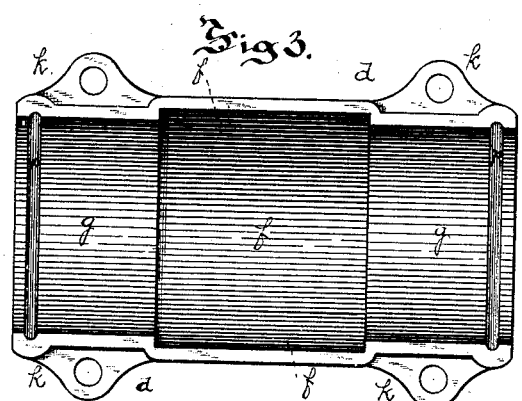
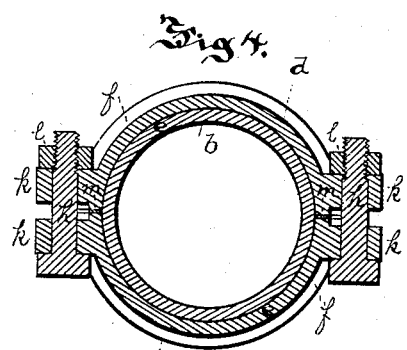
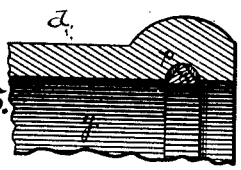
Witnesses.
J. W. Cooke.
Jas. W. Graham.
Inventor.
Clarence Phillis.
by his Attorney
James T. Kay

UNITED STATES PATENT OFFICE.

CLARENCE PHILLIS, OF PITTSBURG, PENNSYLVANIA, ASSIGNOR OF ONE-HALF TO J. B. PHILLIPS, OF SAME PLACE.

PIPE-COUPLING.

SPECIFICATION forming part of Letters Patent No. 320,683, dated June 23, 1885.

Application filed February 13, 1885. (No model.)

*To all whom it may concern:*

Be it known that I, CLARENCE PHILLIS, of Pittsburg, in the county of Allegheny and State of Pennsylvania, have invented a new and useful Improvement in Protective Coverings for Pipe-Joints; and I do hereby declare the following to be a full, clear, and exact description thereof.

My invention relates to means for forming tight joints for pipe-lines, its object being to brace and strengthen or support the ordinary pipe-joint, in such manner as to prevent injury thereto from lateral or transverse strain, and also to prevent the escape of gas or other fluid passing through the line in case of leakage at the joints. The ordinary pipe-joint is formed of threaded wrought-metal tubing, and a coupling-socket internally threaded, into which the ends of the pipe are screwed. The thread at the ends of the tubing is cut into the body thereof, and consequently the tubing is weakened thereby, it being well known that a line of tubing is not stronger than the strength obtained at the joint, and it often occurs where this tubing is in any way subjected to lateral or transverse strains that the tubing will crack or break in the thread close to the coupling-socket, the socket acting as a fulcrum, and the entire transverse strain coming on the tubing where it is weakened by the cutting of the thread. It is also well known that this threaded joint, on account of the difficulty of forming the threads on both the socket and tubing exactly corresponding, and on account of the subtlety of natural gas, does not form a secure joint for this natural gas, the gas eating out any material with which the thread is coated, and leaking between the threads of the tubing and screw-socket, so that it is necessary to obtain a more perfect means of retaining this gas.

My invention has special reference to the joints employed with pipe-lines used in conducting this natural gas, though it may be employed to advantage with pipe-lines and fittings used for other fluids; and its object is to relieve the joint of this lateral or transverse strain, and at the same time form an outside covering around the joint, so as to prevent leakage where the joint is not perfectly tight.

It consists, essentially, in protective covering for pipe-joints formed of a longitudinally-divided cylindrical box having a depression therein to receive the socket, and having broad faces on each side of said depression, conforming in shape to the outer face of the tubing, and having means for securing the box around the tubing, said box being placed around the joint, and fitting close to and clamped around the body of the tubing, and so acting to support the joint and relieve it from all lateral and transverse strain, and at the same time form a tight covering to the tubing at the joint and prevent the escape of any gas or other fluid leaking through the ordinary screw-joint. It also consists in certain details of construction, hereinafter set forth.

To enable others skilled in the art to make and use my invention, I will describe the same more fully, referring to the accompanying drawings, in which—

Figure 1 is a side view of pipe-line having my improved covering secured thereto. Fig. 2 is a longitudinal section thereof. Fig. 3 is a view of one-half of the box. Fig. 4 is a cross-section on the line *x x*, Fig. 1; and Fig. 5 is an enlarged detached view of the packing-ring employed, and its seat in the covering-box.

Like letters of reference indicate like parts in each.

The line of pipe illustrated is formed of the pipe-sections *a b*, having the ordinary threaded ends and connected together by the screw-socket *c*, these parts being of ordinary construction. Fitting around this line of pipe at the joint is my improved box *d*, which is formed of the two parts or halves *e e*, being divided longitudinally, so that they can be placed around the joint after it is made. In the center of these parts or halves is the depression *f*, for the reception of the coupling-socket, this depression corresponding substantially in shape thereto, and between this depression and the ends of the box are the broad faces *g*, these faces conforming in shape or sections to the outer faces of the tube, so that when the box is clamped around the tubing these broad faces will fit close thereto, and so give a support to the tubing at the joint, relieving the threaded portions of the tubing and the coupling-socket of the lateral or transverse strain to which they are ordinarily subjected. As these faces are broad, they extend for some distance along the body of the tubing on the sections a b, beyond the threaded portions thereof, and so the box forms a strong brace or support from one tube-section to the other, beyond the parts weakened by the cutting of the threads. The two parts e e of the cylindrical covering-box can be clamped together by any suitable means, that shown in the drawings being preferred, and consisting simply of the bolts h, passing through lugs k cast on the two parts e e of the covering-box and fastened by nuts l.

To form a tight packing between the two parts of the cylindrical box, I employ lead packing-plates m, cut from a sheet of lead corresponding to the bearing-faces of the two parts, and packing-rings n, fitting in annular recesses p at the ends of the covering-box, and when the box is clamped in place the lead packing-plates m and packing-rings n are compressed and squeezed out, so as to form perfectly-tight joints between the meeting edges of the covering-box and the covering-box and tubing. As it is an essential feature of my invention that the broad faces g g of the covering-box fit closely against the body of the tubing, and if the annular packing-recesses p correspond exactly to the shape of the packing-rings fitting therein, these packing-recesses might be entirely filled with lead, and the lead extend out beyond the faces g and prevent said faces from fitting close against the tubing, I have formed the packing-recesses p and the packing-rings n of different shape, so that while they will form a tight joint between the covering-box and the tubing they will not prevent the box from being clamped tightly against the tubing. For example, the packing-recesses p are in the drawings provided with curved walls, and the packing-rings n are formed with straight walls—that is, said packing-rings are triangular in cross-section—and when the rings are compressed within the recesses the upper or outer edge thereof will press against the bottom of said packing recess, and the lower face thereof against the face or body of the tubing, and so form a tight joint, and in case this tight joint is obtained before the broad faces g of the covering-box are pressed close against the body of the tubing, the packing-rings, while still forming a tight joint, will be pressed out of shape and compressed so as to fill the greater portion of the packing recesses, the rings being compressed until they conform substantially to the shape of the packing recesses. The same result would be obtained where the packing-ring employed was square or of other shape differing from the shape of the packing-recess.

In employing my improved covering-box after the ordinary pipe-joint is formed the two parts of the box are placed around the joint, the lead or other packing placed between the bearing-edges of the two parts e e of the box and within the packing-recesses p, and by means of bolts and nuts or other suitable clamping apparatus the two parts of the box are clamped tight around the joint, the bolts being screwed up until the broad bearing-faces g g of the box are pressed closely against the body of the tubing on each side of the coupling-socket and beyond the threaded portions of the tubing, thus securing the cylindrical covering-box in place. The covering-box thus forms a strong support between the two tube-sections at the joint and relieves the screw-socket from any transverse or similar strains, so preventing the fracture of the tubing in the parts weakened by the cutting of the threads, and also preventing the opening of the joint by any strain, except the ordinary longitudinal strain upon the expansion and contraction of the tubing. In case the joint should leak, as the covering-box is perfectly packed around the body of the tubing it will prevent any leakage whatever at the joint, thus overcoming a great objection to the use of this threaded tubing in connection with gas-lines where the gas is carried through the tubing under high pressure.

Where the covering-box is to be employed in connection with T's and L's and other coupling-sockets of peculiar form, the recess or depression f to receive the socket can of course be made corresponding in shape thereto.

The packing used in connection with the covering may be lead or other suitable packing, soft metal, or rubber, or similar material, according to the purposes for which the line of pipe is employed and the packing most suitable therefor.

What I claim as my invention, and desire to secure by Letters Patent, is—
1. In combination with a pipe-joint, a longitudinally-divided cylindrical covering-box having a depression to receive the socket of the pipe-joint, and broad bearing-faces on each side thereof conforming to the body of the tubing and adapted to be clamped around the same, substantially as and for the purposes set forth.

2. In combination with a pipe-joint, a longitudinally-divided cylindrical covering-box having a depression to receive the socket of the pipe-joint and broad bearing-faces on each side thereof conforming to the body of the tubing, and suitable packing between the edges of the box and the body of the tubing, substantially as and for the purposes set forth.

In testimony whereof I, the said CLARENCE PHILLIS, have hereunto set my hand.

CLARENCE PHILLIS.

Witnesses:
JAMES I. KAY,
J. N. COOKE.